United States Patent [19]
Arena

[11] Patent Number: 5,651,513
[45] Date of Patent: Jul. 29, 1997

[54] LINEAR FLAP DRIVE SYSTEM

[75] Inventor: Aldo Arena, Smithtown, N.Y.

[73] Assignee: Northrop Grumman Corporation, Los Angeles, Calif.

[21] Appl. No.: 396,843

[22] Filed: Mar. 1, 1995

[51] Int. Cl.⁶ .................................................. B64C 3/50
[52] U.S. Cl. ........................ 244/75 R; 244/215; 244/216
[58] Field of Search ............................ 244/213, 214, 244/215, 216, 218, 219, 75 R; 74/521, 106

[56] References Cited

U.S. PATENT DOCUMENTS

| | | | |
|---|---|---|---|
| 1,138,715 | 5/1915 | Young | 74/521 |
| 2,158,676 | 5/1939 | Engelhardt | 244/216 |
| 2,218,114 | 10/1940 | Kunze | 244/216 |
| 2,524,605 | 10/1950 | Servanty | 244/216 |
| 2,698,753 | 1/1955 | Kellman et al. | 74/521 |
| 3,698,668 | 10/1972 | Cole | 244/219 |
| 4,180,222 | 12/1979 | Thornburg | 244/75 R |
| 4,247,066 | 1/1981 | Frost et al. | |
| 4,405,105 | 9/1983 | Dilmaghani | 244/216 |
| 4,605,187 | 8/1986 | Stephenson | |
| 5,161,757 | 11/1992 | Large | |
| 5,230,487 | 7/1993 | Gartelmann et al. | |

*Primary Examiner*—Galen L. Barefoot
*Attorney, Agent, or Firm*—Terry J. Anderson; Karl J. Hoch, Jr.

[57] ABSTRACT

A linear flap drive system for an aircraft having an airfoil and at least one flap which is extendable from the trailing edge of the fixed wing. More particularly the system includes linear drive elements and extending and positioning dynamic structures which together deploy the flaps from the airfoil. Further disclosed is a coupling of the dynamic structures to the corresponding flaps, by which coupling the process of extension causes an out-of-plane rotation of the flaps. In addition, there is provided a lateral end track and roller support assembly which guides the flaps as they are extended and positioned by the drive system. A lateral end power transmission assembly enables the linear drive assemblies to be driven by a common motive force.

16 Claims, 12 Drawing Sheets

LINEAR FLAP DRIVE SYSTEM

BACKGROUND OF THE INVENTION

1. Field of the Invention

The present invention relates to a flap deploying drive assembly. More particularly, the invention relates to a flap drive system for an aircraft having at least one linear drive assembly for linearly extending a deployably mounted flap section and at least one dynamic structure for rotationally positioning the flap.

2. Discussion of the Prior Art

The extension and positioning of flaps during flight requires mechanisms which are capable of withstanding considerable aerodynamic stresses with little tolerance for error. It is clearly understandable that the reliable functioning of such flaps is critical to the safe operation of aircraft. Present flap drive systems which exist in the prior art generally comprise either wide so-called "canoes" along which the extending flap are motively translated or complex assemblies having a considerable number of components and requiring a large housing volume within the airfoil. The number of components and volumetric requirements are considerable drawbacks for the practical applications of these designs.

In addition, the "canoes" have the important shortcoming of presenting a large aerodynamic cross-section, also known as "blockage", to the air which passes between the extended flap and the airfoil. The free flow of this air is critical because it reenergizes the airflow as it is turned by the wing and flaps. Without the stream of air which flows between the wing and extended flap, the total turning angle of the wings and flaps could not exceed a given angle, for example, ordinarily approximately 28 degrees, without inducing boundary layer separation and endangering the aircraft by reducing lift. Any large cross-sectional structural presence, such as a canoe, which is positioned between the airfoil and the flap interferes with the free flow of the refreshing airstream, and results in reduced flap efficiency. One further shortcoming of large structural fairings or "canoes" is that with the flaps retracted and the aircraft flying at relatively high speeds the canoes create higher aerodynamic drag, resulting in higher fuel consumption, and reduced aircraft range.

Alternative flap drive assemblies have been proposed which attempt to address a selected few of the problems associated with the canoe-style flap drives. For example, U.S. Pat. No. 5,161,757 to Large teaches a bent shaft flap drive wherein the rear flap is mounted on an elongate shaft which extends linearly from within the fixed airfoil to the surface of the deployable flap. The portion of the shaft which extends into the structure of the flap is bent at an angle and fitted with a set of rollers so that it may rotate with respect to the inside of the flap. As the elongate shaft is extended from the airfoil to deploy the flap away from the wing, it is simultaneously rotated by an actuator mounted within the wing which causes the flap to rotate about an axis parallel to the wing line. Large addresses the problems of complexity and exposing large cross-sectional surfaces to the airflow which passes between the extended flap and the fixed wing. Large does not, however, resolve the volumetric concerns within the fixed airfoil nor is it as reliable a system as is desirable in commercial aircraft.

Another disclosure which attempts to avoid excessive disturbances of the airflow between the extended flap and the fixed airfoil is disclosed in U.S. Pat. No. 5,230,487 to Gartelmann et al. Gartelmann teaches a drive and guide mechanism for a flap having three sets of interlocking rods and lever arms, a wheeled carriage journaled to a track within the fixed wing, and a complex set of joints and drive motors all mounted within the wing box of the fixed airfoil. While presenting a reduced surface area to the airflow between the airfoil and the flap, the reference fails to address the concerns of volumetric restriction, complexity, and reliability.

Both U.S. Pat. No. 4,605,187 to Stephenson and U.S. Pat. No. 4,247,066 to Frost et al. disclose wing flap deploying mechanisms which have addressed these problems as well. Both publications, however, teach complex assemblies with many component parts, and which require that considerably larger volumetric regions be reserved for them. In addition, Stephenson teaches an internally disposed apparatus which, upon extension of the flap exposes a considerable aerodynamic cross section to the air which flows between the fixed wing and the deployed flap. Frost teaches a bendable truss structure which simply does not provide any region between the flap and the wing through which air may flow to refresh the boundary layer and assist the air flow turning across the wing.

The principal objects of the present invention are:

(1) to provide a flap drive system which reduces external fairings, or "canoes," thereby reducing aerodynamic drag, and by extension, requisite fuel consumption;

(2) to provide a flap drive system having fewer component parts, and by extension a lower cost, than known flap drive systems;

(3) to provide a flap drive system which occupies a comparably smaller region within the airfoil to reduce volumetric interference with apparati housed therein, i.e. landing gear; and (4) to provide a flap drive system which is efficient, effective and reliable in operation, and is easy to maintain.

SUMMARY OF THE INVENTION

In accordance with the objects of the invention, a motive drive assembly for extending and positioning a deployably mounted flap is disclosed. In one preferred embodiment the invention comprises a plurality of motive drive assemblies individually disposed within the structure of a fixed airfoil portion of a wing, or within a deployable reference flap from which another flap may be subsequently deployed. The motive drive assemblies extend and position the deployed flap from the fixed wing or reference flap. For the purposes of this disclosure, the term "reference flap" shall be used to describe a flap from which another flap is deployed, and the term deployable shall be used to describe any flap which may be deployed from either a fixed wing or a reference flap. In such an embodiment, a deployable fore flap may be extendably deployed and positioned aft of the fixed wing; the deployable aft flap may be extendably deployed and positioned aft of the fore flap which is thereby a reference flap.

In this preferred embodiment the plurality of motive drive assemblies each comprise linear drive elements, each coupled to sets of extending and positioning dynamic structures, respectively. One linear drive assembly is mounted within the airfoil, at the trailing edge, coupled to its corresponding set of extending and positioning dynamic structures. These dynamic structures are also coupled with the deployable fore flap; each structure being coupled with the fore flap at a primary yoke for extending and positioning the flap in accordance with the translation of the linear drive element.

A separate linear drive element is mounted within the fore flap, which is also a reference flap for a deployable aft flap, for extending the aft flap from it. A corresponding set of extending and positioning dynamic structures is disposed between the reference flap and the aft flap, each structure being coupled with the aft flap at its yoke. As with the deployment of the fore flap from the fixed wing, the dynamic structures extend and position the aft flap in accordance with the translation of its corresponding linear drive assembly.

The extending and positioning dynamic structures of this embodiment comprise a scissoring hinged structure having two elongate elements, a sway bar and a torsion bar, which are hingeably connected. One end of the torsion bar, herein referred to as the translating drive end, is translatably coupled to the linear drive element whereby translation of the drive assembly displaces the translating drive end in the linear direction. One end of the sway bar, herein referred to as the fixed drive end, is pivotally coupled at a fixed point along the linear direction of the drive element. The fixed end provides the reference about which the structure's motion is defined. It shall be understood that the function and teaching of the present invention would not be meaningfully altered if the fixed drive end and the translating drive end were reversed, wherein the torsion bar would be fixed and the sway bar would be translatingly coupled to the linear drive element.

One of the two other ends of one of the two bars, herein referred to as the extension end, is coupled to the flap which is to be extended. In this preferred embodiment, the bar having the extension end is the torsion bar. The second of the other ends, herein referred to as the hinge end, is hingeably attached to the shaft of the opposing torsion bar, with the hinge end therein defining the hinge point about which the scissoring action of the extending and positioning dynamic structure occurs. The bar having the hinge end is referred to as the sway bar.

The linear drive elements comprise means for selectively moving the translating drive ends of the extending and positioning dynamic structure with respect to their corresponding fixed drive ends, along a line transverse to the extending direction of the corresponding deployed flap. A variety of alternate specific drive elements are compatible with the teachings of the present invention, including, but not limited to, extending hydraulic actuators, geared rotary actuators, and ballscrew assemblies. The resultant scissoring action of each dynamic structure redirects the motive impetus provided by the drive element, which is transverse to the deploying direction, to a perpendicular direction whereby a flap can be extended.

In this embodiment, the deployable flaps are slideably mounted to the fixed wing, or to any other structure which remains stationary relative to the motion of the flap, in a manner which permits extension of the flaps, as well as rotation perpendicular to the plane defined by the flaps, but which mounting restrains any appreciable rotation in the plane defined by the flaps. With these constraints, the rotational positioning of the flap is provided by the coupling which joins the extension end of the torsion bar to the yoke of the corresponding flap. The coupling comprises a skewed axis pivot joint. The restraint against in-plane rotation motion assists the skewed axis pivot joint coupling in causing an out-of-plane angular displacement when the flap is extended.

In another variation of this preferred embodiment, all of the linear drive elements are motively driven by a common drive element, to which they are individually coupled by power transmission gear boxes.

In the variation of this embodiment in which the linear drive elements comprise ballscrews, the translating drive end is pivotally affixed to a nut which is threaded on the elongate ballscrew. Either the nut itself, or the translating drive end, further comprises upper and lower support rollers which are seated in transverse tracks mounted parallel and adjacent to the screw element. The transverse tracks provide additional stability to the primary torsion bar during its linear movement.

A separate embodiment of the present invention comprises linear drive elements which are mounted parallel to the direction of flap extension. These parallel drive elements are mounted within the fixed airfoil and the reference flap for extending the fore flap and aft flap, respectively. In this separate embodiment the dynamic structures differ from the dynamic structures described above. These dynamic structures, also referred to as rotation imparting structures, do not actively extend the flap, but are slaved to the linear drive elements and have only the function of causing an out-of plane rotation as the flap is extended or retracted.

In this embodiment the linear drive elements which extend the flaps comprise a multisection mechanism having individual drive elements coupled to the airfoil, the fore flap, and the aft flap, as well as a guide track which provides support to the extending members. The multisection mechanism of one variation of this embodiment comprises ballscrews which are coupled to threaded nuts mounted on the lateral ends of the deployable flaps. Each ballscrew, which corresponds to a given deployable flap, is pivotally connected in torque transferring relation with subsequent ballscrews in the multisection mechanism by means of pivoting gearing assemblies.

The dynamic structure, such as the rotation imparting structure, of this embodiment comprises a hinged, scissoring joint with two arms, the base arm and the positioning arm. One end of the base arm, which is the opposite end of the arm from the hinge, is pivotally fixed to the trailing edge of the airfoil or flap, in a manner which permits pivoting of the base arm through a range of angles within the plane of the airfoil or reference flap to which it is attached. The base arm pivot constrains the rotation imparting structure against motion out of the plane of the airfoil or reference flap.

The hinge of the joint is unattached and remains otherwise free to move; its range of motion being constrained to the plane of the airfoil or reference flap.

One end of the positioning arm, which is the opposite end of the arm from the hinge, is coupled to the deployable flap being extended. This coupling is made with the yoke of the deployable flap and is a skewed axis joint pivot, similar in function to the pivot described above with respect to the first embodiment.

The extending action of the corresponding linear drive mechanism causes the hinged scissoring joint which is slaved to it to expand from a closed position through an increasing angle. As a result, the positioning arm of the joint moves relative to the yoke of the deployable flap. The skewed axis joint pivot correspondingly provides a torque to the deployable flap, inducing a rotation out of the plane of the fixed wing or reference flap from which it has been deployed.

Both embodiments introduced above, as well as others which may be described below, or those for which rigorous details shall remain unspecified but which are nevertheless within the scope of the present invention, may further comprise a selectable angle actuator mechanism at the yoke of the deployable flap for altering the angular relationship defined at the skewed axis joint pivot and therein the extent of flap rotation. In an embodiment including such a mechanism, rotational positioning of the flap is still slaved to its extension, however the given angular rotational of the flap per length of extension is selectable.

BRIEF DESCRIPTION OF THE DRAWINGS

Reference may now be had to the following detailed description of the various embodiments of the invention, taken in conjunction with the accompanying drawings; in which.

DETAILED DESCRIPTION OF PREFERRED EMBODIMENT

Figure 1:
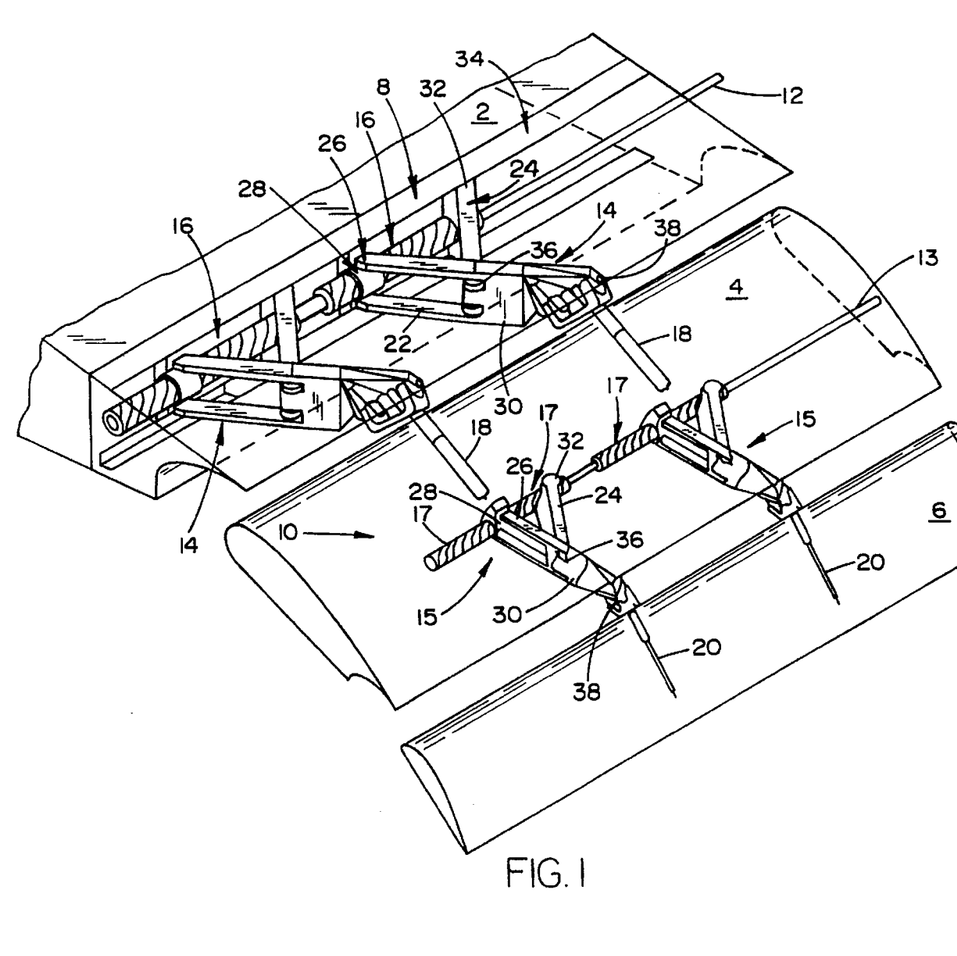
FIG. 1 is a perspective view of the linear flap drive system of the invention in an extended position.

The present invention, in its various aspects and embodiments comprises a drive assembly for extending and positioning at least one deployable flap from a fixed wing or reference flap. Referring to FIG. 1, a perspective view of a airfoil 2 is shown having a pair of deployable flaps, a fore flap 4 and an aft flap 6, in an extended position. FIG. 1 also shows the pair internally mounted motive drive assemblies 8,10 (first drive assembly 8 and second drive assembly 10) for extending the pair of deployable flaps 4 and 6, which assemblies are the subject of the present invention. The assemblies 8,10 comprise a pair of linear drive elements 12,13; in essence, a first linear drive element 12 and a second drive element 13, and corresponding sets of extending and positioning dynamic structures 14,15. The linear drive elements 12,13 of the embodiment shown in FIG. 1 comprise two sets of ballscrew elements 16,17 to which corresponding extending and positioning dynamic structures 14,15 are coupled in translatable relation.

It is understood that alternate drive elements may be equivalently substituted in the present invention without exceeding the broad scope of the invention. Such substitutions include, but are not limited to, hydraulic actuators and geared rotary actuators.

The first linear drive element 12 is mounted to the trailing edge support structure 34 of the airfoil 2 and comprises a rotatable ballscrew rod 16. Linear drive element 12 is coupled to a first set of extending and positioning dynamic structures 14, disposed between the first linear drive element 12 and the fore flap 4. The fore flap 4 is coupled to the first dynamic structures 14 by yoke elements 18.

The first extending and positioning dynamic structures 14 each comprise a torsion bar 22 and a sway bar 24. The drive end 26 of each torsion bar is pivotally mounted to a nut 28 which is threaded about the corresponding ballscrew element 16, and which nut 28 translates along the ballscrew element 16 in accordance with rotations of the same. The drive end 32 of each sway bar 24 is pivotally coupled to a stationary position on the frame 34 of the trailing edge of the airfoil 2. The hinge end 36 of each sway bar 24 is hingeably coupled to the shaft of the corresponding torsion bar 22 in a manner which provides for a scissoring action of the entire dynamic structure as the nut 28 is translated along the ballscrew 16 of the linear drive element. It is desirable to connect the hinge end of the sway bar 24 at the midpoint on the torsion bar 22 such that the length of the sway bar is equivalent to the distance from the hinge point on the torsion bar to the drive end 26; in as much as this will ensure that the extension of the flap is linear. The extension end 30 of each torsion bar 22 is coupled to the corresponding yoke 18. It is understood that alternate length ratios of sway bar to torsion bar pivots will provide non-linear motion that may be desirable in certain applications as can be accommodated by certain alternative wing geometries.

In the embodiment illustrated in FIG. 1, which corresponds to a highly preferred embodiment of the present invention, the coupling of the extension end 30 of each torsion bar 22 to its appropriate yoke 18 comprises a skewed axis pivot joint 38. (A skewed axis pivot joint is one in which the axis about which the joint turns is not perpendicular to either arm of the joint, thereby causing the arms of the joint to move in a non-coplanar manner. In the present embodiment the turning axis of the joint 38 is skewed with respect to the torsion bar 22 and the yoke 18.) The use of the skewed axis pivot joints 38 causes the flap to rotate down and out of the plane of the airfoil 2 as the flap 4 is extended.

Drive elements 13 and dynamic structure elements 15, each being of a type similar to like elements 12 and 14, are mounted in the trailing edge of the fore flap 4, for extending and positioning aft flap 6.

Figure 2:
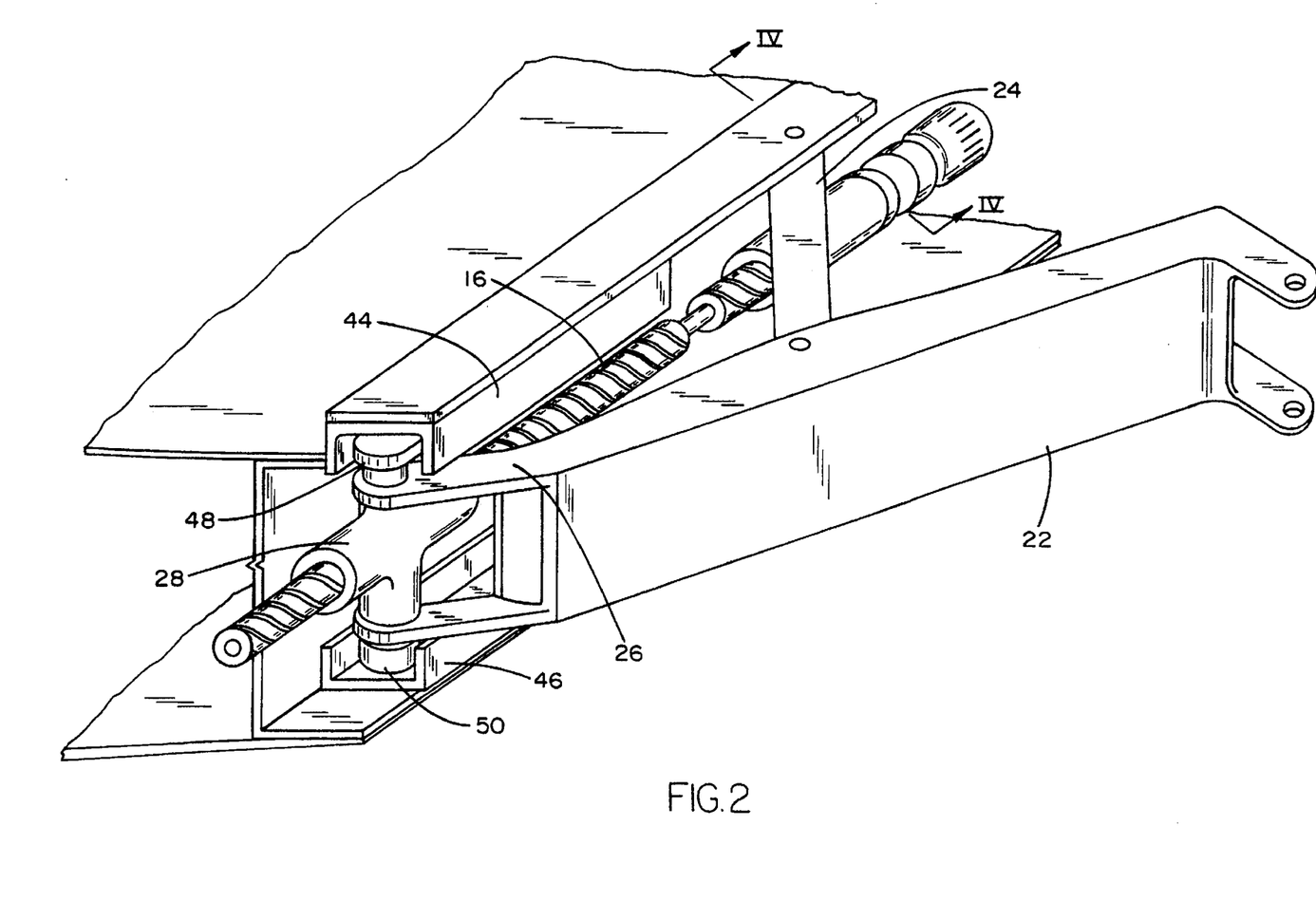
FIG. 2 is a perspective view of the transverse track system of the invention.

Referring now to FIG. 2, the coupling of the drive end 26 of the torsion bar 22 to the nut 28 which is threaded onto the ballscrew 16 is shown in a perspective view. It is understood that the portion of the drive assembly 8, which is shown in FIG. 2 is illustrative of the assemblies which are mounted on the trailing edge of both the airfoil 2 and the fore flap 4. In the assembly, selected rotation of the ballscrew 16 causes a corresponding translation of the nut 28 along the ballscrew 16, thereby effecting a scissoring action of the extending and positioning dynamic structure 14 which extend or retract the flap which is coupled thereto. The illustrated coupling of the drive end 26 of the torsion bar 22 to the ballscrew 16 and nut 28 further comprises upper and lower transverse tracks 44 and 46, mounted parallel to the ballscrew 16 in which support rollers 48 and 50 travel. The guiding and stabilizing function of the tracks 44,46 and rollers 48,50 eliminates undue rotational stress on the ballscrew 16 and nut 28 as a result of dynamic air pressure during the operation of the aircraft.

Figure 3:
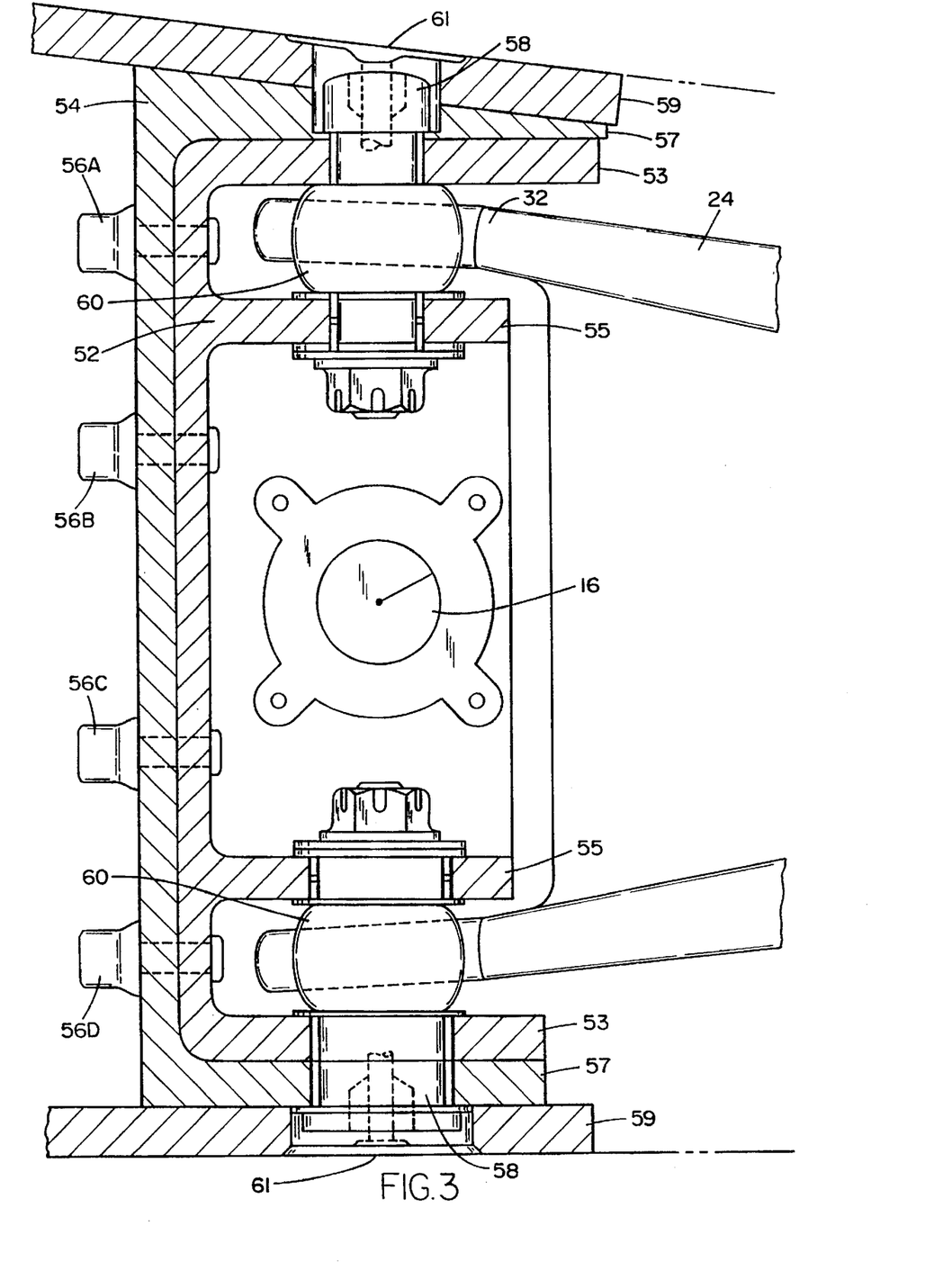
FIG. 3 is a cross sectional view of the pivot connection of the sway bar and the wing box of the invention taken along line IV—IV of FIG. 2.

Referring now to FIG. 3, the fixed pivoting coupling of the sway bar 24 to the airfoil 2 (or the fore flap 4) is shown in cross sectional view; the plane of the cross section being perpendicular to the through axis of the ballscrew 16. A sway bar support housing 52 is affixed to the rear beam 54 of the airfoil 2 (or the fore flap 4) by through fasteners 56A–D. The top and bottom portions of the support housing 52 each include outer and inner surfaces 53 and 55 disposed in generally coplanar spaced relationship to one another. The drive end 32 of the sway bar 24 is fixed and pivotally mounted in support housing 52, between the inner and outer surfaces 53 and 55, by top and bottom through bolts 58. Bushings 60 are disposed on bolts 58 between the inner and outer surfaces 53,55 which support the drive ends 32 of the sway bar 24 within support housing 52 while allowing for the pivotal movement thereabout.

In the embodiment illustrated in FIG. 3, the through bolts 58 pass through the surfaces 53 and 55, as well as the top and bottom surface portions 57 of rear beam 54 and through the outer surface skin 59 of the airfoil or flap. The bolts 58 are, in turn, counter-sunk through the airfoil or flap skin 59 and the top and bottom surfaces 57 of the C-beam 54. The counter-sinking permits the application of a false skin covering 61 over the bolt through holes to eliminate any aerodynamic impact of the mounting structure.

Figure 4:
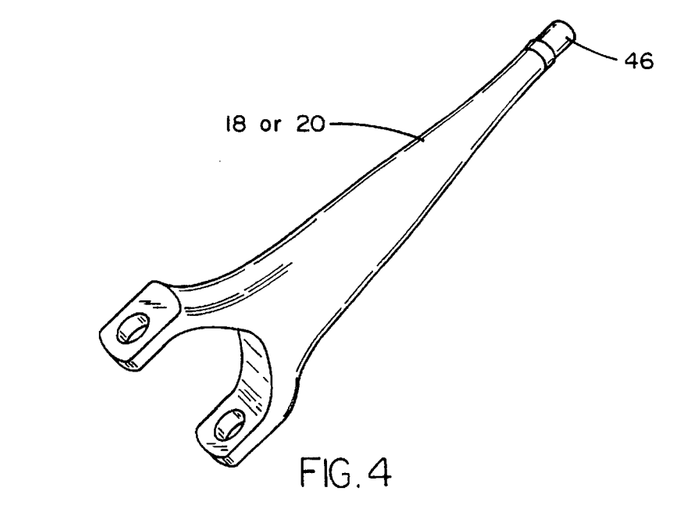
FIG. 4 is an isometric view of the yoke of the invention.
Figure 5:
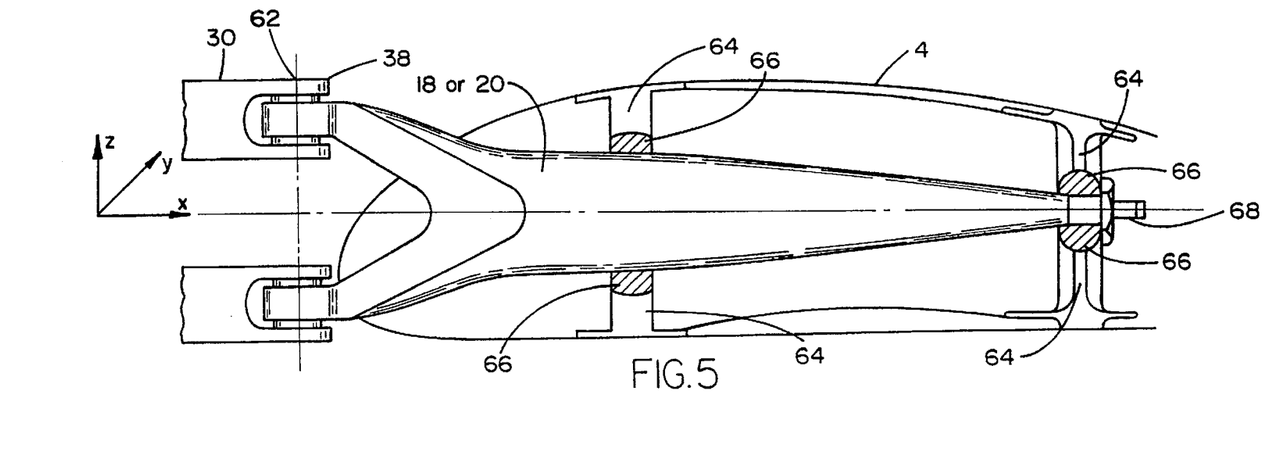
FIG. 5 is a cross sectional view of the yoke through the fore flap.

Referring now to FIGS. 4 and 5, the yoke 18 or 20 of the present invention and its coupling to the hinge end 30 of the corresponding torsion bar 22 are shown, respectively, in perspective views. The yokes 18 or 20 support the flaps, such as fore flap 4 and aft flap 6, respectively, and move them according to the motion of their respective couplings with the dynamic structures 14,15. An individual yoke 18 or 20 is coupled to the hinge end 30 of its corresponding torsion bar 22 by a skewed axis joint pivot 38. The function of a skewed axis pivot 38, such as is mounted in the present invention, is to cause an out-of-plane angular rotation, in the Z-axis direction, of one arm of the joint relative to the other as a result of an in-plane angular change, in the XY plane, of the arms of the joint. This functionality is achieved by coupling two arms to a joint having an axis of rotation which is not perpendicular to either arm. The yoke 18 or 20 is mounted within the flap 4 or 6 by mounts 64. Mounts 64, in conjunction with bushings 66, secure the yoke 18 or 20 within the flap 4 or 6 without preventing the rotational movement thereof which is associated with the action of the skewed axis joint pivot 38. The angular motion of the torsion bar 22 relative to the yoke 18 or 20 causes the out-of-plane rotation of the flap into or out of an aerodynamically engaging position as it correspondingly extends or retracts the flap.

Figure 6:
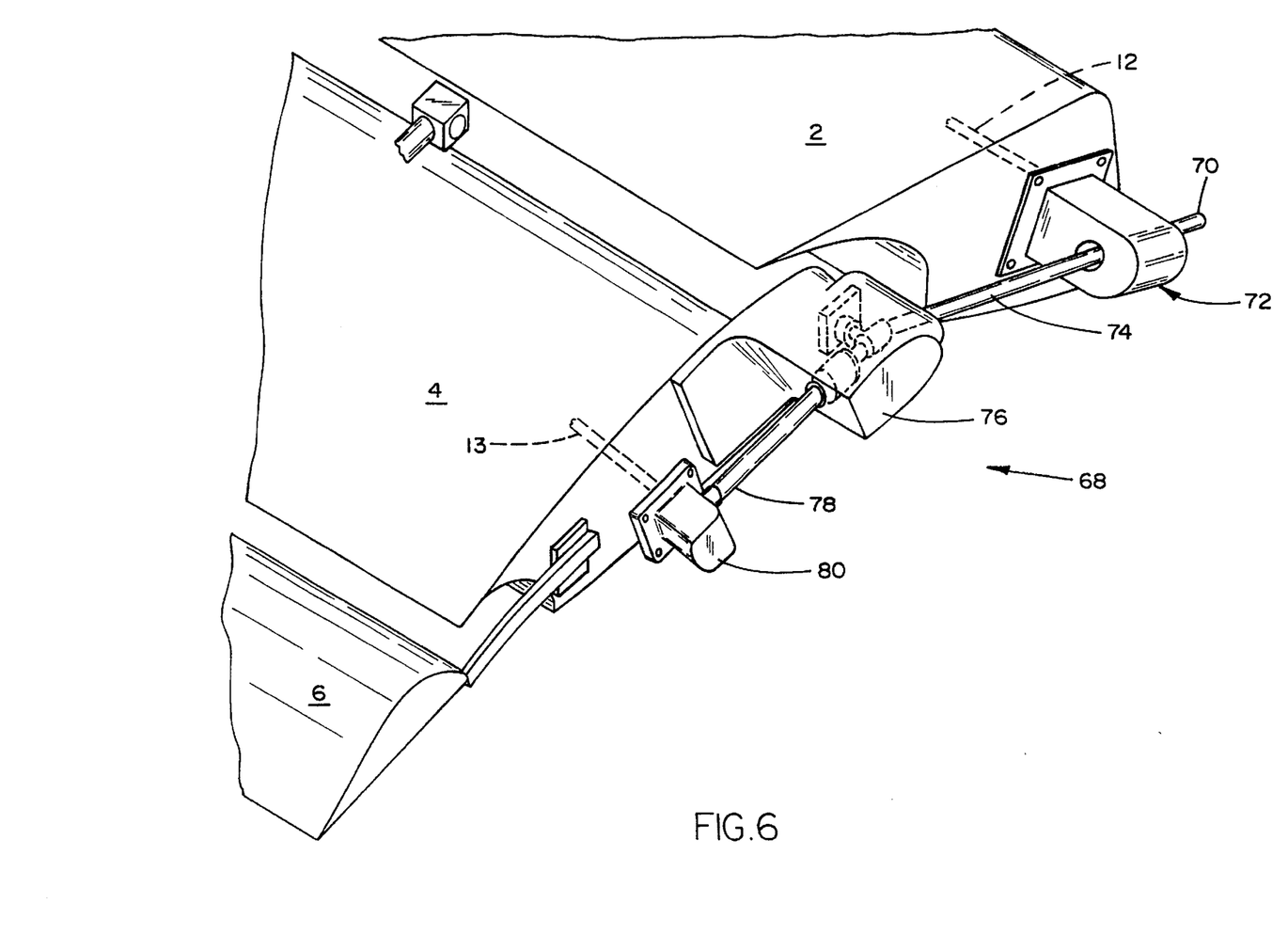
FIG. 6 is a perspective view of the end power transmission components of the invention.

Referring now to FIG. 6, a airfoil and flap lateral end mounted power transmission assembly 68 for transferring motive force to the linear drive elements 12 and 13 of the present invention is illustrated in a perspective view. The power transmission assembly 68 comprises a main drive shaft 70, through which rotational torquing power is transmitted from an external driver (not shown). This main drive shaft 70 provides power to the system. The drive shaft 70 is mounted to an airfoil gear box 72, at which gear box a gearing subassembly (not shown) transfers some of the torquing power of the shaft to the linear drive element 12 which is also coupled to the airfoil gear box 72. A telescoping torque transferring drive shaft 74, which is coupled to the airfoil gear box 72, is also coupled to an angular torque transfer gear box 76. The end of the torque transferring telescoping drive shaft 74 is pivotally mounted in a torque transferring relationship within the angular torque transferring gear box 76. Within the angular torque gear box 76 is a gearing assembly (not shown) which couples to the pivotally mounted torque transferring telescoping shaft 74, thereby transferring torque to a aft flap drive shaft 78.

During operation, drive shaft 70 drives the gearing subassembly within airfoil gear box 72 such that linear drive element 12 rotates and extends the fore flap. This flap extension necessitates a telescoping drive shaft 74 for the function of transferring torque to the angular torque transferring gear box 76 which is mounted on the fore flap 4. The telescoping action of drive shaft 74 accommodates the linear displacement of the fore flap 4 from the airfoil 2; the pivotal coupling of the telescoping drive shaft 74 to the angular torque transferring gear box 76 permits the gear box to continually transfer torque independent of any rotational movement of the flap 4.

The distal end of the aft flap drive shaft 78 couples to a fore flap gear box 80, in which box 80 a gearing assembly (not shown) transfers the remaining torque to the linear drive element 13 which actuates the drive assembly 17 and the dynamic structure 15 within the fore flap 4, and effects the extension and positioning of the aft flap 6.

A preferred embodiment of the aspect of the present invention which is shown in FIG. 6 further comprises a selectively disengaging gearing assembly within the airfoil gear box 72 which permits the selective engagement of the telescoping drive shaft 74. The selective nature of this engagement therein permits the potentially desirable operability which is the independence of the extension and positioning of the fore flap 4 with respect to the extending or positioning the aft flap 6.

In another preferred embodiment the independence of the extending processes may be maintained by having the external torque be provided to the linear drive elements 12,13 from separate sources. Such an embodiment would have a redundancy, and therein a heightened reliability, which is desirable in critical mechanical systems.

Figure 7:
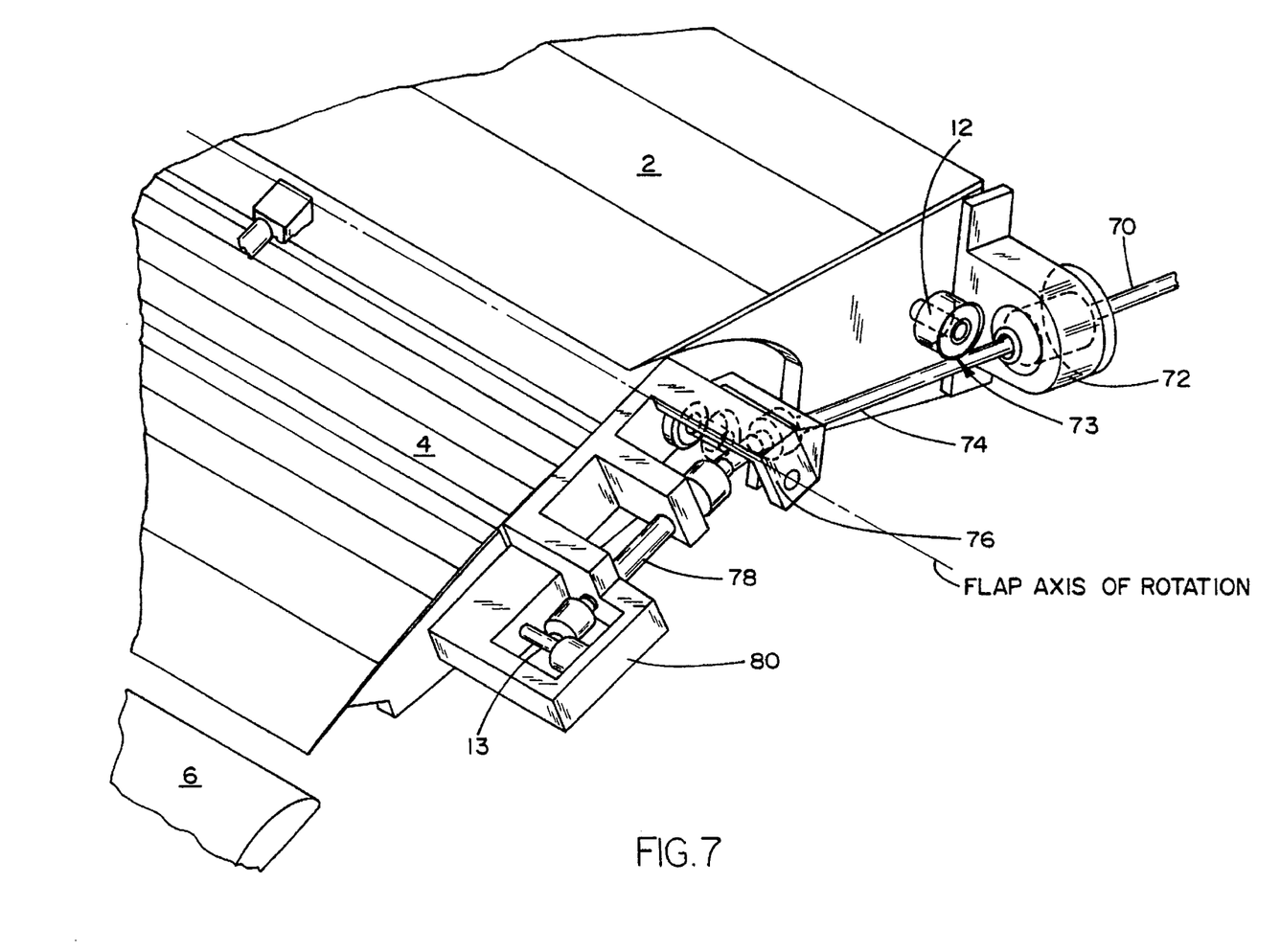
FIG. 7 is a perspective view of the end power transmission components with the flaps fully extended.

Referring now to FIG. 7, another embodiment of the lateral end power transmission drive assembly 68 aspect of the present invention is presented in substantially the same view as FIG. 6. In this embodiment, the linear drive element 12 engages the telescoping drive shaft 74 at a point 73 outside, and aft of, the airfoil gear box 70, instead of engaging the main drive shaft 70 within the gear box 72.

Figure 8:
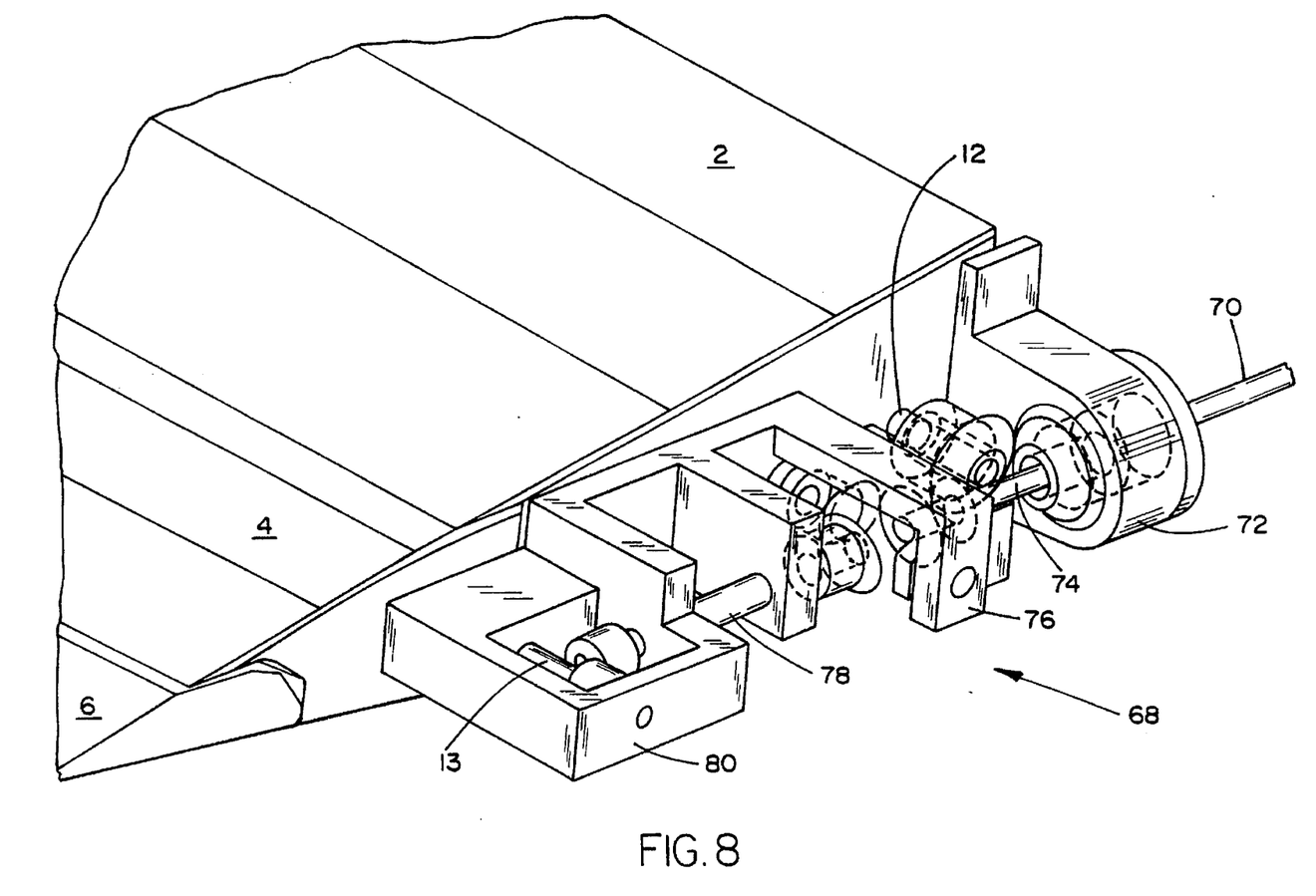
FIG. 8 is a perspective view of the end power transmission components with the flaps retracted.

In FIG. 8, lateral end power transmission drive assembly 68 of the present invention, as described with respect to FIG. 7, is presented in substantially the same view as FIGS. 6 and 7. In this illustration, however, the assembly is shown with the flaps 4,6 in a fully retracted position.

Figure 9:
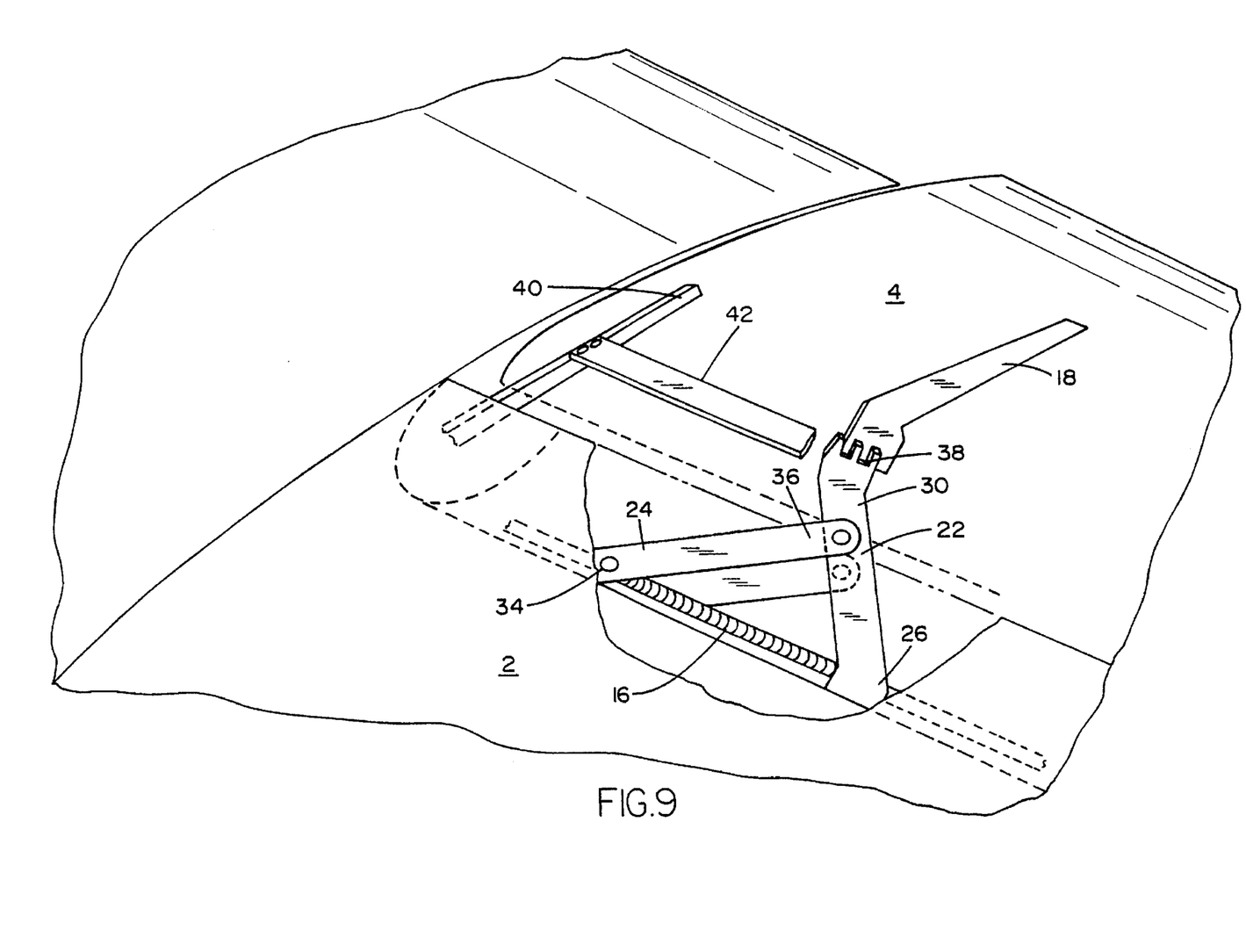
FIG. 9 is a perspective view of the fore flap end track support of the invention, partially broken away.

Referring now to FIG. 9, a partially broken away view of the airfoil 2 and fore flap 4 and their corresponding linear drive assembly for extending and positioning the fore flap is provided. In addition, FIG. 2 includes a view of an end track 40 disposed on the inner surface of the airfoil 2. The end track 40 receives a roller support 42 extending laterally from the fore flap 4. It is understood that multiple roller supports may be included if the magnitude of air load so requires. During extension of the fore flap 4 from the airfoil 2, the end track 40 and roller support 42 serve to stabilize the motion of the fore flap 4. In addition, the roller support 42 is affixed to the fore flap 4 in such a manner that it does not interfere with the rotational angular displacement of the flap 4 with respect to the airfoil 2. By aligning the roller supports and the skewed axis pivot joint along the hinge line about which the flap rotates, no interference of the rotational angular displacement of the flap is generated.

Figure 10:
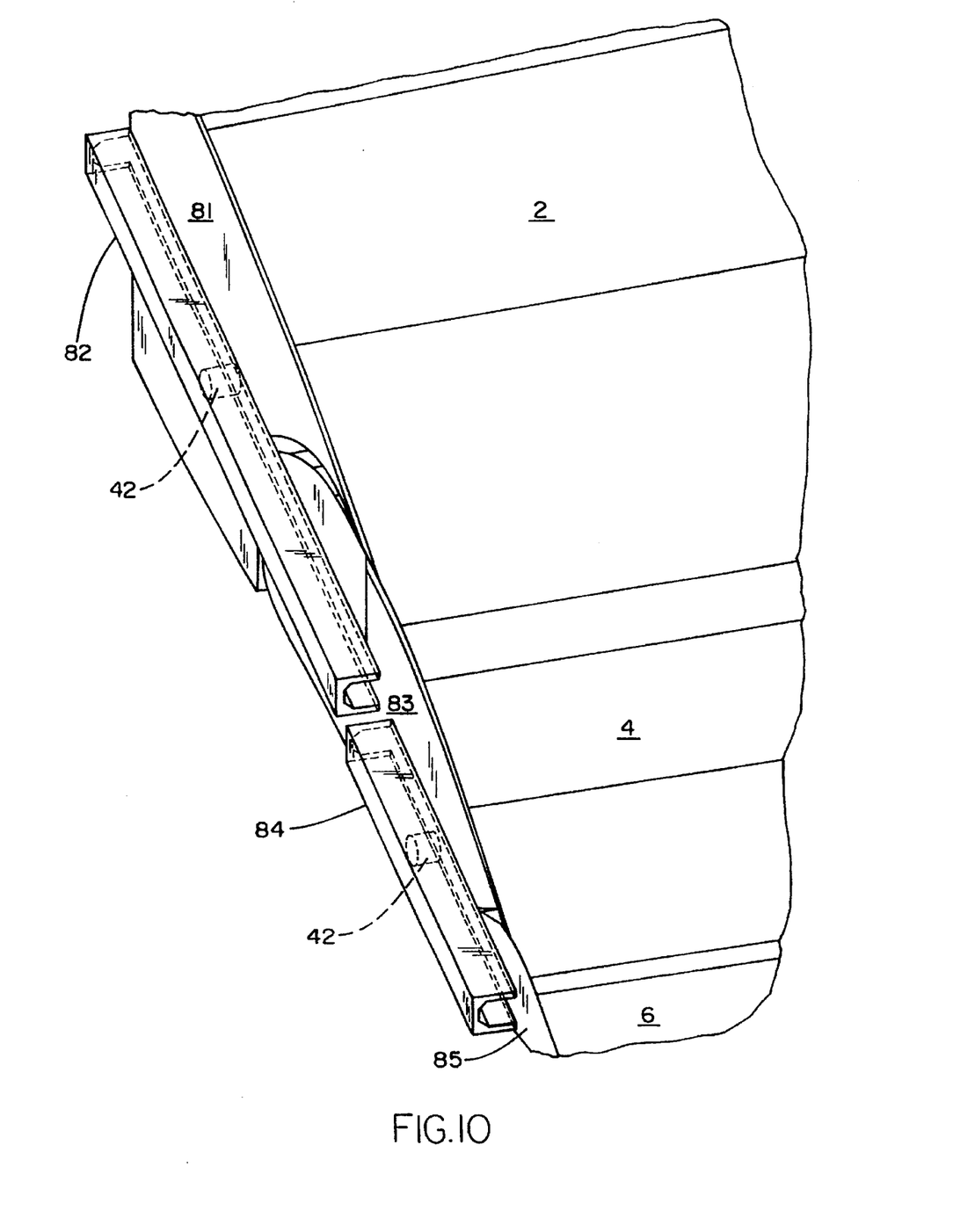
FIG. 10 is a perspective view of the end flap support tracks of the invention with the flaps retracted.

Referring now to FIG. 10, a variation of the aspect of the present invention which is the end track support system 40, which was described above with respect to FIG. 9, is illustrated in a perspective view with the flaps 4,6 in their retracted position. A fore flap end track 82 is affixed to the outside edge of the strut 81 of the airfoil 2 and extends beyond the aft portion of the airfoil 2 to a position adjacent to the forward portion of strut 83 which defines the lateral side flap 4. A roller support 42 extends forward from the strut 83 and is disposed within the end track 84 such that the roller support 42 slides along the track 82 when the fore flap 4 is displaced from the airfoil 2.

An aft flap end track 84 is affixed the aft portion of strut 83 and extends beyond the fore flap to a position adjacent to the forward portion of strut 85 which defines the outer lateral side of the aft flap 6. A roller support 42 extends forward from the strut 85 and is disposed within track 84 such that the roller support 42 slides along the track 84 when the aft flap 6 is displaced from fore flap 4.

Figure 11:
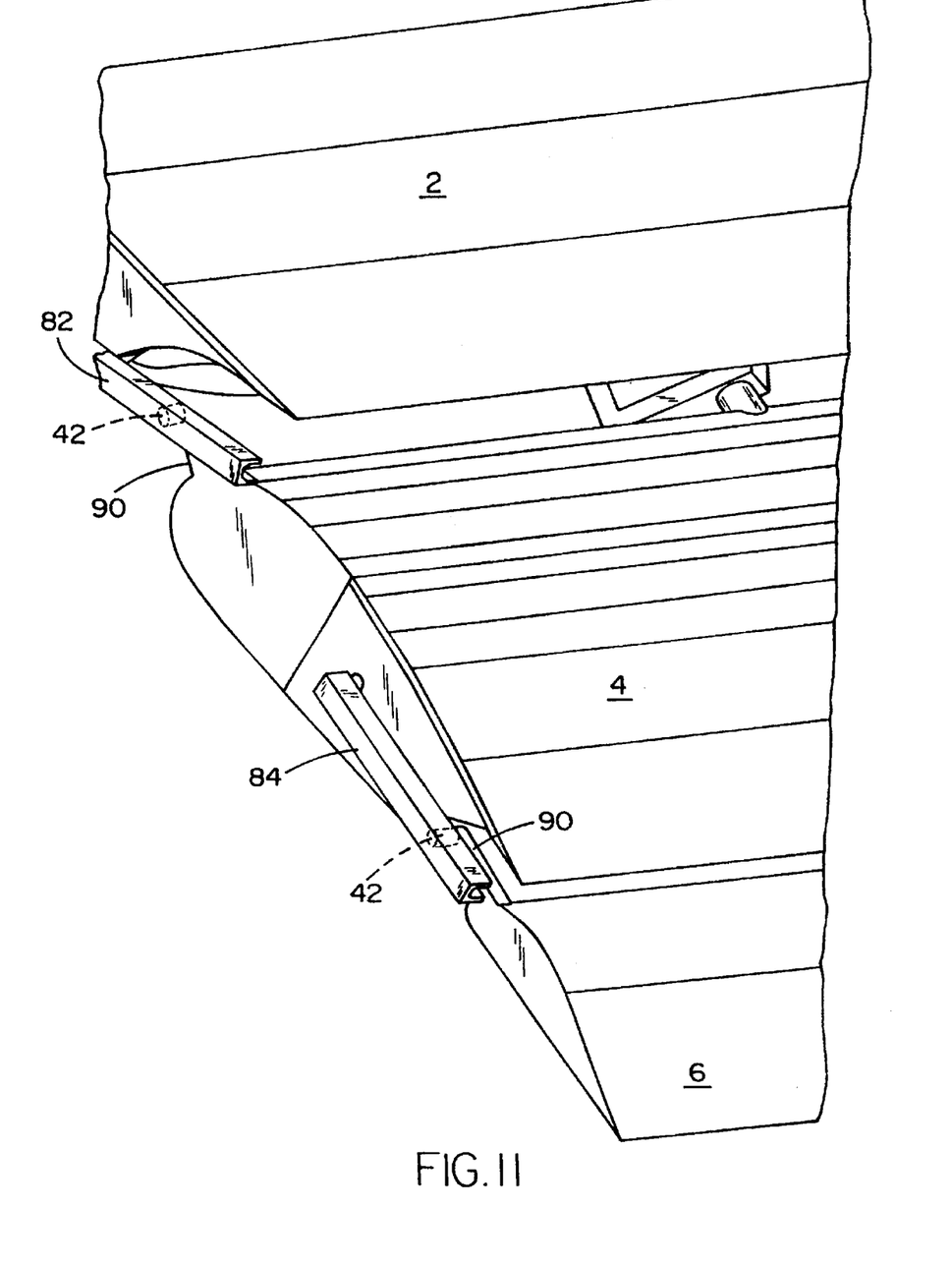
FIG. 11 is a perspective view of the end flap support tracks of the invention with the flaps extended.

Referring now to FIG. 11, a perspective view of the lateral end track assembly 40 as described with respect to FIG. 10 is illustrated wherein the flaps 4,6 are in their extended configuration. As can be seen, roller supports 42 extend forward from the flap 4,6 on roller support arms 90. The extension of the flaps 4,6 causes roller supports 42 to travel along the tracks 42 thereby supporting the flaps 4,6 and maintaining the stable motion thereof.

Figure 12:
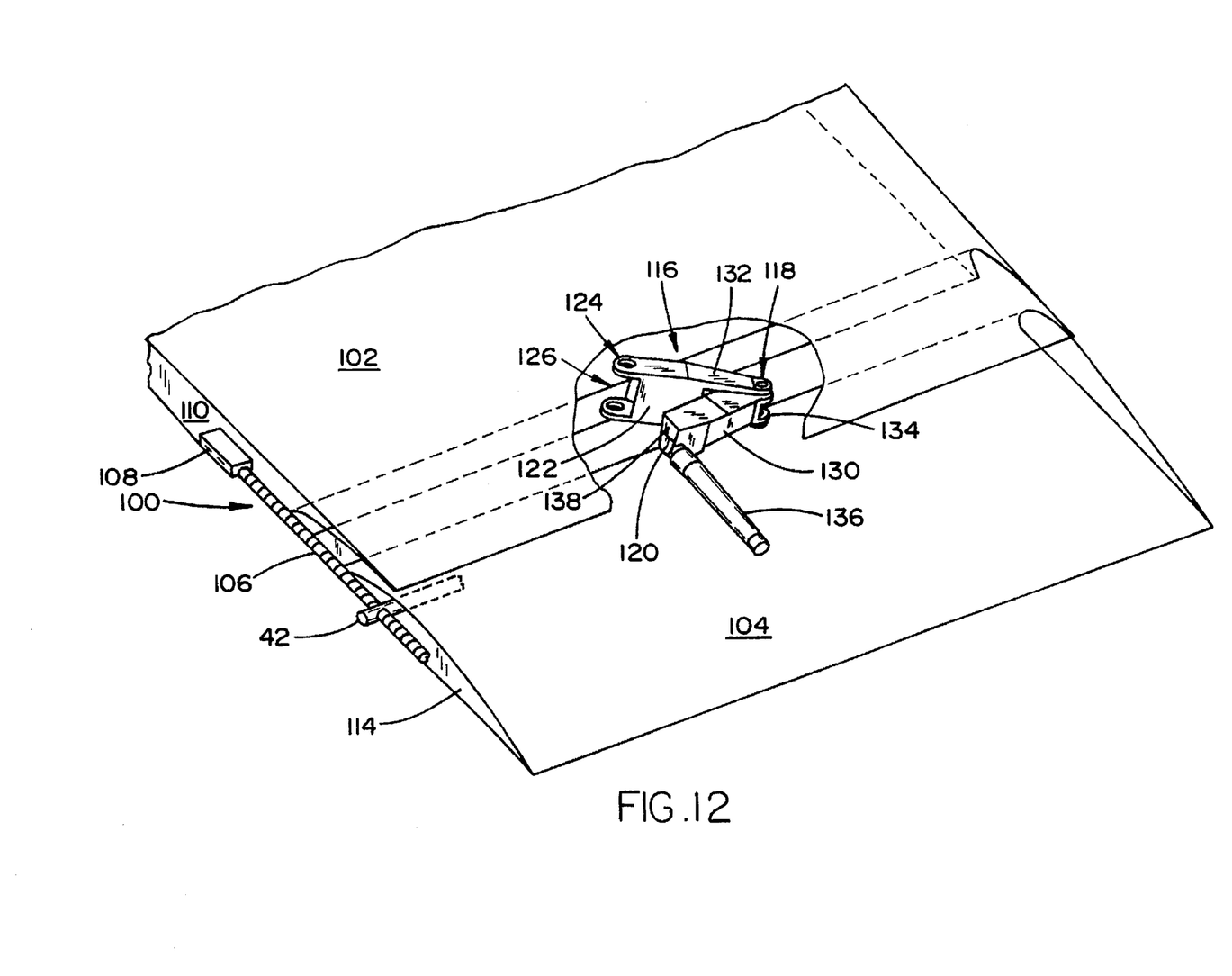
FIG. 12 is a perspective view of another dynamic structure which is another aspect of the present invention, shown in a closed position with the corresponding flap in a retracted position.

Referring to FIG. 12, an alternative embodiment of the present invention wherein the extending and rotationally positioning elements of the flap drive system are separate, is illustrated in a perspective view wherein the airfoil 102 has only a single flap 104 and it is in its retracted position. In this embodiment, an extending drive mechanism 100 is mounted to the lateral end of the flap 104. In the illustrated embodiment of FIG. 12, the drive mechanism comprises a threaded rod 106 which extends from a drive power transmission gear box 108, mounted on the lateral side of a main airfoil strut 110, to a rotationally pivoting fixed nut element 112 which is mounted to the lateral end of the flap 104. External application of a torque, through the drive power transmission gear box 108 rotates the threaded rod 106 which is matingly and translationally engaged by the nut element 112. The rotation of the rod thereby causes the flap 104 to translate with respect to the airfoil 102. The nut element 112 is mounted to be rotationally pivoting because an angular rotation of the flap, which is an important aspect of the present invention, alters the relative angular orientation of the threaded rod 106 with respect to the flap 104.

The angular rotation of the flap 104 with respect to the airfoil 102 is effected by a rotation imparting structure 116 and in correspondence with the extension of the flap 104. The rotation imparting structure 116 comprises a hinged joint 118 and a skewed axis joint pivot 120. The base end 124 of the base arm 122 of the hinge joint 118 is coupled in a planar pivoting manner to the trailing edge of the airfoil 102. The planar pivot 126 permits the base arm 122 to rotate through a wide angle within one plane and be constrained against rotation in any out of plane direction. The joint ends 132 and 134 of the base arm 122 and the extending arm 130 are coupled together at hinge joint 118, which hinge joint 118 is otherwise unconstrained. The extending end 138 of the extending arm 130 is coupled to a yoke 136 at skewed axis joint pivot 120. The yoke 136 is a structural element mounted within the flap 104 wherein a torque applied to the yoke 136 effects a rotation of the flap 104.

It is understood that in such an embodiment as illustrated in FIG. 12, having a rotation imparting structure which permits the flap to slide laterally with respect to the reference structure, a set of lateral roller supports (not shown in FIG. 12) are required to stabilize the deployment of the flap.

The skewed axis joint pivot 120 of this embodiment is similar to the skewed axis joint pivot 120 of the first embodiment. The axis of rotation of the pivot is non-perpendicular to the yoke 136 and the extending arm 130. The specific angular skew of the rotation axis defines the out-of-plane rotation and inclination of the flap per length of extension, and therefore must be set for specific flight parameters by angle actuators or physical manipulation.

Figure 13:
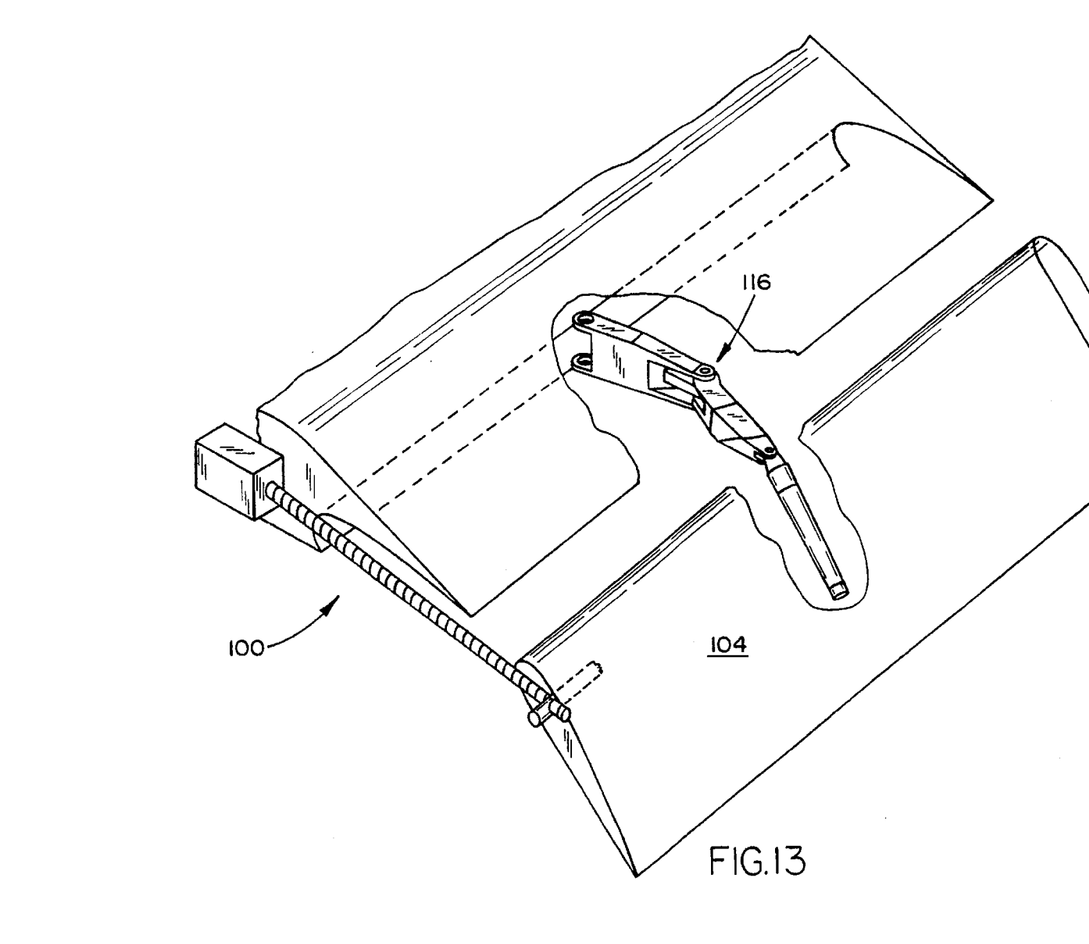
FIG. 13 is a perspective view of the aspect of the present invention of FIG. 12, shown in an open position corresponding to the extended and rotationally positioned flap.

Referring now to FIG. 13, the embodiment which has been described with respect to FIG. 12 is shown in a perspective view wherein the flap 104 has been extended by the drive element 100 and positioned by the rotation imparting structure 116 in a manner according the teachings of the present invention.

While several embodiments of the present invention have been shown and described, it is to be understood that many changes and modifications may be made thereunto without departing from the spirit and scope of the invention as defined in the appended claims.

What is claimed is:

1. A flap drive system for an aircraft for extending and positioning at least one deployable flap from a reference structure, comprising:

at least one linear drive element, operatively coupled with said at least one deployable flap, mounted to the reference structure, said at least one linear drive element having a driving axis oriented transverse to the direction of flap extension, which at least one linear drive element produces a motive force; and at least one dynamic structure having separate extending and rotational positioning elements, said at least one dynamic structure being coupled to said at least one deployable flap and motively coupled to said at least one linear drive element, said dynamic structure thereby being driveable by said linear drive element, and which dynamic structure extends and rotates the deployable flap in accordance with the motive force of the linear drive element said flap rotation being imparted by a structure causing an out-of-plane rotation and lateral sliding movement to the at least one deployable flap upon the extension of said flap.

2. The flap drive system according to claim 1, wherein said at least one extending and positioning dynamic structure comprises:

a sway bar having a drive end pivotally fixed to said reference structure;

a torsion bar having a drive end pivotally and translatably coupled to said at least one linear drive element for translating said drive end linearly with respect to the drive end of the sway bar;

an extension end of the torsion bar coupled to the at least one deployable flap; and a hinge end of the sway bar having a hinge coupled to the torsion bar, whereby relative motion of the drive ends of said bars imparts an angular motion to said hinge, whereby said angular motion causes a translation of the extension end of the torsion bar which extends said at least one deployable flap.

3. The flap drive system according to claim 2, wherein said at least one deployable flap further comprises a yoke structure, and wherein the extension end of the torsion bar is coupled to said yoke structure, said coupling comprising a skewed axis joint pivot, which pivot causes an out-of-plane rotation of the deployable flap in correlation with a change in the relative angular relationship between the torsion bar and the yoke during said extension.

4. The flap drive system according to claim 2, wherein the reference structure comprises upper and lower tracks mounted, respectively, above and below, and extending parallel to the at least one linear drive element, upper and lower roller supports of the drive end of the torsion bar correspondingly translate respectively, in the upper and lower tracks during actuation of the at least one linear drive element.

5. The flap drive system according to claim 1, wherein said at least one linear drive element comprises a rotatable ballscrew rod and wherein the motive coupling of said at least one dynamic structure to said ballscrew rod comprises a nut, which nut translates with respect to the ballscrew rod upon rotation thereof.

6. The flap drive system according to claim 1, wherein said at least one linear drive element comprises an extending hydraulic actuator, which actuator is coupled to the dynamic structure such that extension of the hydraulic actuator drives the dynamic structure.

7. The flap drive system according to claim 1, wherein the reference structure further comprises support tracks, support rollers mounted on the deployable flap being translatably engaged in said support tracks so as to stabilize the extension and positioning of the at least one deployable flap.

8. The flap drive system according to claim 1, wherein said at least one deployable flap comprises two or more sequentially mounted flaps, said flaps including a fore flap deployably mounted to a fixed wing and subsequent aft flaps mounted sequentially thereto.

9. The flap drive system according to claim 8, wherein said at least one linear drive element corresponding to each deployable flap are driven by a common power source.

10. The flap drive system according to claim 9, wherein power from said common power source is transmitted to said linear drive elements through a power transmission gear boxes assembly.

11. The flap drive system according to claim 10, wherein the power transmission gear boxes assembly comprises:
    an airfoil gear box interiorly disposed within the fixed wing, to which gear box the at least one linear drive element corresponding to the fore flap is coupled in motive force receiving relation;
    a drive shaft coupled at one end to the common power source, and at its other end to said airfoil gear box;
    an angular torque transferring gear box mounted on the fore flap, for maintaining power transmission during angular positioning thereof;
    a torque transferring telescoping drive shaft coupled at one end to the airfoil gear box and at its other end to the angular torque transferring gear box, said telescoping shaft being capable of transferring torque during the extension of the deployable flap from the fixed wing;
    a flap gear box, mounted to the fore flap, to which is coupled the linear drive element disposed in the fore flap which deploys a first one of said sequential aft flaps; and
    a flap drive shaft coupled at one end to the angular torque transferring gear box, and at an opposite end to the flap gear box, for transmitting power from the former to the later.

12. A flap drive system for an aircraft for extending and positioning at least one deployable flap from a reference structure, comprising:
    an extending drive mechanism, mounted to the reference structure and coupled to said at least one deployable flap, which drives the at least one deployable flap linearly to its extended position; and
    at least one rotation imparting structure, coupling the deployable flap to the reference structure, which rotation imparting structure imparts an out-of-plane rotation to the at least one deployable flap upon the extension of the at least one deployable flap.

13. The flap drive system according to claim 12, wherein the extending drive mechanism comprises a rotatable ballscrew rod and is connected to the at least one deployable flap by a nut mounted thereon, said nut being threadably engaged by the ballscrew, whereby selected rotation of the ballscrew linearly extends the at least one deployable flap from the reference structure.

14. The flap drive system according to claim 12, wherein the extending drive mechanism comprises an extending hydraulic actuator coupled to the at least one deployable flap for linearly extending same from the reference structure.

15. The flap drive system according to claim 12, wherein upper and lower tracks are disposed respectively, above and below, and extending parallel to, the extending drive mechanism, and support rollers mounted on the deployable flap, which rollers are engaged within said tracks, therein increasing the stability of the at least one deployable flap as it is extended from the reference structure.

16. The flap drive system according to claim 12, wherein the at least one rotation imparting structure comprises:
    a base arm having a base end and a hinge end, said base end being coupled to the reference structure at a planar pivot, which pivot permits the base arm to rotate within a plane;
    an extending arm having an extending end and a hinge end, said extending end being coupled to a yoke within the at least one deployable flap at a skewed axis joint pivot; and
    a hinge joint coupling the hinge ends of the base arm and the extending arm;
    whereby extension of the at least one deployable flap by the extending drive mechanism opens the hinge joint, and causes a change in the angular relationship between the yoke and the extending arm at the skewed axis joint pivot, which angular change imparts an out-of-plane rotation to the deployed flap through the skewed axis joint pivot.

* * * * *